United States Patent
Schindler et al.

(10) Patent No.: US 8,310,089 B2
(45) Date of Patent: Nov. 13, 2012

(54) POWER SHARING NETWORK COMMUNICATIONS DEVICE

(75) Inventors: Frederick Roland Schindler, Sunnyvale, CA (US); Rudolph B. Klecka, III, Austin, TX (US); Scott Lawrence Lennartz, Portland, OR (US); John Alvin Herrmann, Round Rock, TX (US); Yonghan Kang, Austin, TX (US); Dylan Walker, Austin, TX (US); Johnston Reid McGaughey, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 368 days.

(21) Appl. No.: 12/772,700

(22) Filed: May 3, 2010

(65) Prior Publication Data

US 2011/0266867 A1   Nov. 3, 2011

(51) Int. Cl.
*H02J 1/10* (2006.01)
*H02J 3/46* (2006.01)

(52) U.S. Cl. ......................................................... 307/24

(58) Field of Classification Search .................... 307/19, 307/20, 24, 43, 52; 713/300; 361/1
See application file for complete search history.

(56) References Cited

U.S. PATENT DOCUMENTS

| | | | |
|---|---|---|---|
| 5,745,670 A * | 4/1998 | Linde | 714/22 |
| 6,754,835 B2 * | 6/2004 | Bandholz et al. | 713/300 |
| 6,996,458 B2 | 2/2006 | Pincu et al. | |
| 2005/0136989 A1 | 6/2005 | Dove et al. | |

FOREIGN PATENT DOCUMENTS

WO   WO 2004/036399 A2   4/2004
WO   WO 2006/077569 A1   7/2006

* cited by examiner

*Primary Examiner* — Carlos Amaya
(74) *Attorney, Agent, or Firm* — BainwoodHuang

(57) ABSTRACT

A set of network communications devices shares available power among themselves to meet overall system power loading. An individual device is configured to include a local power supply delivering power to a local power bus at a local supply voltage varied in response to a voltage control signal. A protection component is connected between the local power bus and an external power cable used to connect the device to another device for sharing power. The protection component provides an interruptible low-impedance DC path for carrying current based on direction and magnitude of a voltage difference between the local power bus and the external power cable. Control circuitry is used to: (a) drive a current-sharing bus connected among the devices to influence a value of a system current-sharing signal indicating a level of system power loading among the devices; (b) generate a difference signal indicating a difference between local power loading of the local power supply and the system power loading reflected by the system current-sharing signal; and (c) generate the voltage control signal based on the difference signal to achieve a predetermined sharing of the system power loading by the local power supply.

20 Claims, 5 Drawing Sheets

POWER SHARING NETWORK COMMUNICATIONS DEVICE

BACKGROUND

The present invention is related to the field of network communications devices such as switches and routers, and more particularly to techniques by which network communications devices receive operating power.

Network communications devices such as switches and routers conventionally include a power supply which provides operating power at a specified DC voltage from an external source of AC (or in some cases DC) power, such as so-called "mains power" provided from a building power distribution system. A power supply for a device may be designed and sized to meet particular goals, for example to provide a desired degree of availability (reliable operation over time) and to accommodate a reasonably foreseeable highest load that might occur, for example due to incrementally adding circuit boards or other loads to the device as system needs change with time. Availability is sometimes provided in the form of redundancy, where a failed power supply can be replaced with another "standby" or "backup" power supply included either within or external to the network communications device for just that purpose.

There is widespread use of so-called power-over-Ethernet (POE) technology, in which terminal devices such as IP telephones receive operating power from power-sourcing equipment (PSE) device such as a switch over the same Ethernet cables used for communications. A switch functioning as a PSE device includes one or more power supplies that provide both operating power for the switch as well as power to powered POE ports connected to powered devices by Ethernet cable. Thus, the sizing and other design/configuration criteria for power supplies in PSE devices generally must take into consideration the potential for growth and other changes in an overall system including all POE powered devices. One general approach has been to include relatively large-capacity power supplies in PSE devices to provide sufficient capacity for current and expected future POE loads. Another approach has been to dedicate space within PSE devices for accepting an additional power supply at a later time as needs grow. Additionally, in the case of systems requiring high availability, redundancy is typically provided in the form of one or more "backup" power supplies, located either within or external to POE switches.

BRIEF DESCRIPTION OF THE DRAWINGS

Objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Figure 1:
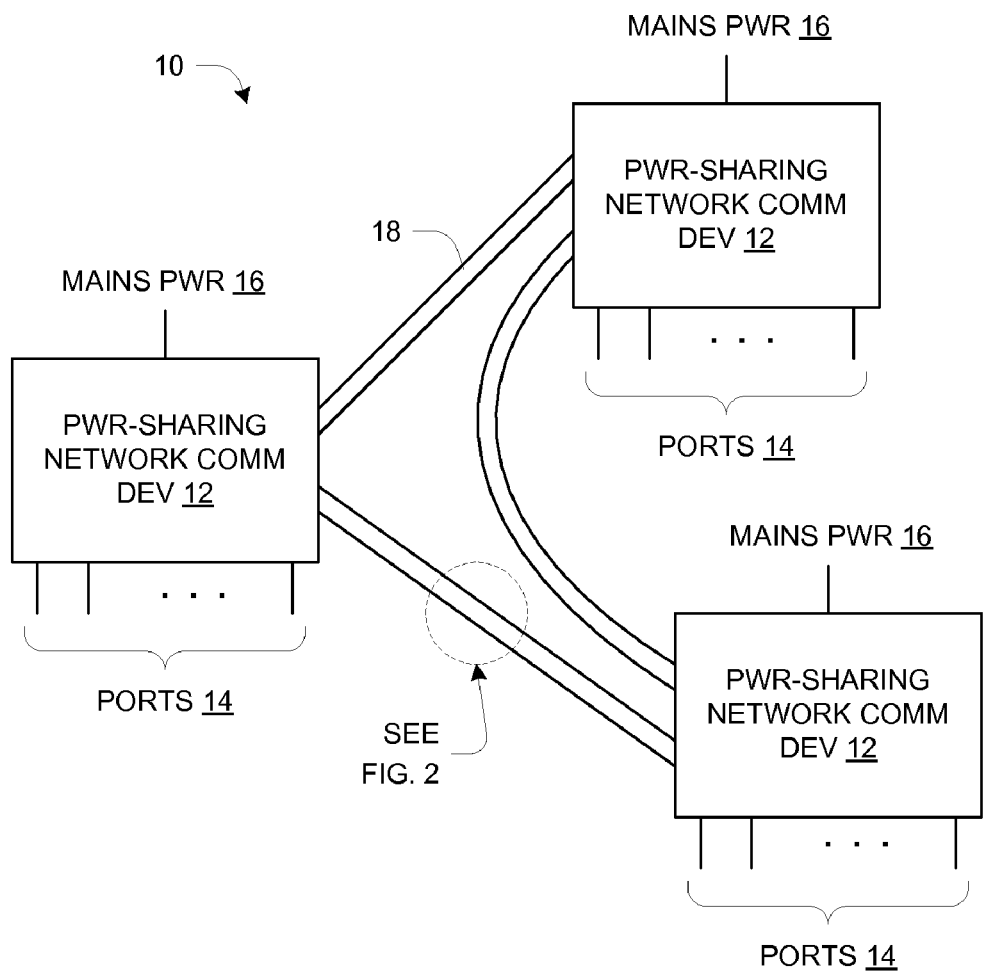
FIG. 1 is a block diagram of a system including a set of power-sharing network communications devices.

Conventional approaches to supplying operating power to network communications devices may suffer from certain undesirable limitations. In systems of devices, it is generally necessary to include at least one power supply in each device, and when redundancy is required to meet availability goals then one or more additional "standby" power supplies are also included (either within each device or externally). Additionally, it is often necessary to make each power supply of sufficient size (capacity) to provide the power required for some future expanded configuration or a foreseeable worst-case loading condition. This latter need arises especially in systems employing power-over-Ethernet (POE) technology. A PSE switch may be selected to have a number of powered ports to allow room for growth in communications and concomitant power needs over time. The power supply for the switch must generally be sized to accommodate the load that may occur under some future full utilization of all powered ports. However, until such future time the power supply may be significantly under-utilized and thus represent an inefficient deployment of resources. Although some systems permit the incremental addition of power supplies as power needs grow, the size of the increment is normally large and thus some level of inefficiency remains. Additionally, the standby or backup power supplies may also represent inefficient use of resources as they may not be providing any supply capacity during normal operation.

In accordance with embodiments of the present invention, methods and apparatus are disclosed by which a set of network communications devices can share available power among themselves to meet overall loading of all the devices. This approach can provide a number of benefits arising from the pooling and adaptable use of power supply resources, such as finer-grained addition of capacity as system needs expand, flexible and efficient provision of redundancy, and the ability to tune operation for different goals such as greater efficiency or greater power supply lifetime.

A system includes a set of power-sharing network communications devices each including network communications operating circuitry for performing a communications functions in the network communication system, such as packet switching or routing. The network communications operating circuitry is connected to a local power bus to draw operating power and constitutes a local load of the network communications device. Each network communications device may further include a local power supply having a power output connected to the local power bus to deliver power at a local supply voltage which may be varied over some predetermined range in response to a voltage control signal.

A set of power cables interconnects the power-sharing network communications devices together to enable power sharing among them. A current-sharing bus is also connected among the power-sharing network communications devices and carries a system current-sharing signal which indicates a level of system power loading of a set of the power supplies distributed among the power-sharing network communications devices.

Each network communications device further includes a protection component and control circuitry. The a protection component is connected between the local power bus and a respective power cable connected to the network communications device, and provides an interruptible low-impedance direct current path for carrying current between the local power bus and the power cable based on direction and magnitude of a voltage difference between them. The control circuitry performs several control operations when a local power supply is installed and operating in the network communications device, including (a) driving the current-sharing bus to influence a value of the system current-sharing signal based on loading of the local power supply, (b) generating a difference signal indicating a difference between a local power loading of the local power supply and the level of system power loading as reflected by the system current-sharing signal, and (c) generating the voltage control signal to control the locally supply voltage from the local power supply based on the difference signal to achieve a predetermined sharing of the system power loading by the local power supply. The predetermined sharing may be tailored to promote any of several goals as mentioned above. For example, the loading may be distributed among the power supplies of the system in proportion to their capacities, resulting in equal percentage loading of each power supply. This approach may promote longer lifetime of all the power supplies. Other sharing schemes can be used to promote other goals, as illustrated by other examples included in the description below.

Description of Example Embodiments

FIG. 1 shows a set 10 of power-sharing network communications devices 12 used in a digital communications system. The network communications devices 12 are referred to by the acronym "NCD" herein. Each NCD 12 may be a network switch or router, for example, having a set of ports 14 that connect to other devices for which the NCD 12 provides network communications functionality (such as packet switching/routing). The ports 14 may be of the type referred to as "xBaseT" where x is a value indicating operating signal rate, such as 10/100/1000 Mb/s as generally known in the art. Additionally, some or all ports 14 are capable of providing DC power to attached devices over the same cable used for network communications. One widely used scheme for providing power over communications cables is so-called "Power over Ethernet", specified by IEEE Std. 802.3. Under an original scheme specified in 802.3af, a port 14 can provide DC power up to about 15 W at a nominal voltage of 48 VDC. Under a newer scheme specified in 802.3at, a port 14 can provide power of about 30 W at a similar voltage. Ports having a power-providing function are referred to as "powered" ports.

The NCDs 12 are shown as receiving input power referred to as "mains power" 16. Mains power is typically AC power provided from a building's electric distribution plant. Each NCD 12 includes one or more power supplies that convert the mains power 16 to DC power for use within the NCD 12 as well as to source power to the powered ports 14 for delivery to attached powered devices. Additional details are provided below. Additionally, the NCDs 12 are interconnected by a set of cables 18 providing a power-sharing capability among the NCDs 12. By sharing power among the NCS 12, a variety of system benefits may be achieved as generally discussed above. As shown, each cable 18 provides a point-to-point connection between a pair of NCDs 12, and each NCD 12 is connected to two cables 18. The arrangement in FIG. 1 is referred to as a "ring" interconnection scheme (or "topology"), in which each NCD 12 is connected to two neighboring NCDs 12 and the overall path among the NCDs 12 forms a loop or ring. Other arrangements are possible, in particular a so-called "star" topology in which each NCD 12 is coupled to a central device that provides switchable paths among the NCDs 12.

Figure 2:
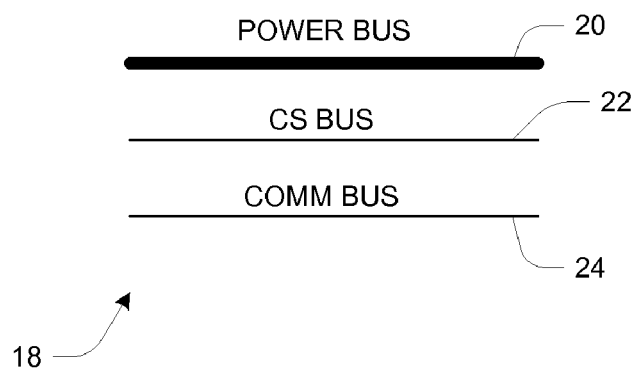
FIG. 2 is a schematic illustration of sub-buses included in a cable used to connect power-sharing network communications devices together.

FIG. 2 schematically illustrates a cable 18. For purposes of the present description, it has three constituents. A power bus 20 is a heavy-gauge cable over which shared DC power flows. In one embodiment the power bus 20 is able to carry up to 40 A of DC current at nominally 56 V. The power bus 20 has both a "hot" wire and a "return" wire. In one embodiment the hot wire has a nominal potential of −56 V while the return wire has a nominal potential of 0 V. The cable 18 also includes lower-gauge wires for carrying signaling information, in particular a current-sharing (CS) bus 22 and a communications bus 24. Additional details of these items are provided below. It will be appreciated that the term "cable" is being used to describe a set of interconnects between NCDs 12, which in general could be carried by one or multiple physical cables.

Figure 3:
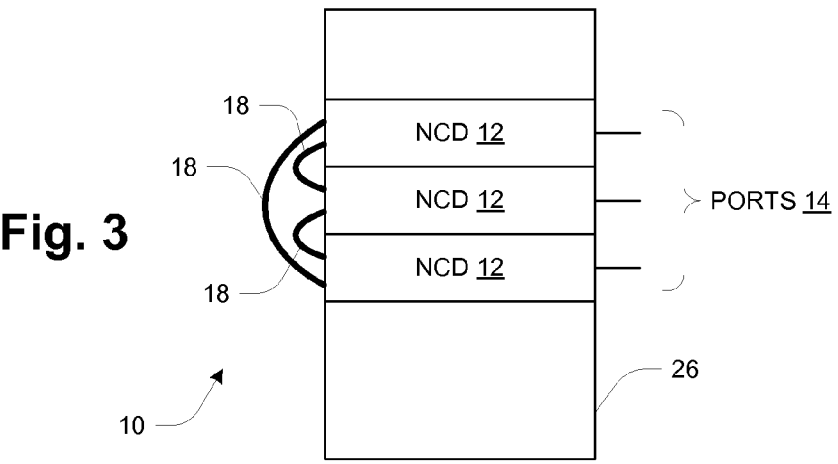
FIG. 3 is a schematic illustration of an arrangement of power-sharing network communications devices in an equipment rack.

FIG. 3 is a schematic side-view depiction of one use and arrangement of the set 10 of NCDs 12. The NCDs 12 are realized in a rack-mount form factor and installed in an electronics equipment rack 26 as generally known in the art. In one common arrangement, physical connections for the ports 14 are arranged at a front side (right side in FIG. 3) while other connections including power connections are arranged at a rear side (left side in FIG. 3). Thus for the NCDs 12, for example, the cables 18 are disposed at the rear side of the rack 26, interconnecting the NCDs 12 as shown. The connections to mains power 16, which may also be at the rear side, are omitted in FIG. 3 for clarity.

Figure 4:
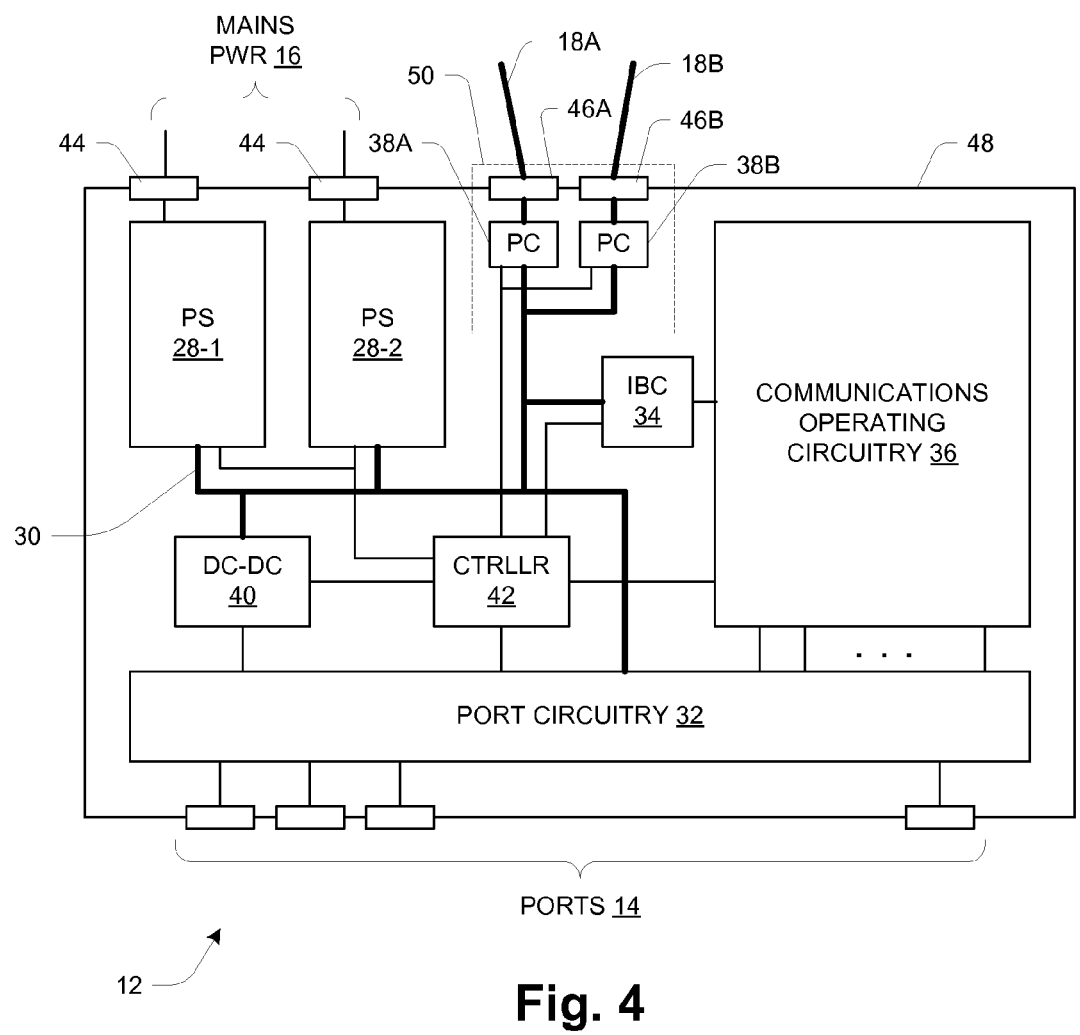
FIG. 4 is a block diagram of a power-sharing network communications device.

FIG. 4 is a schematic block diagram of an NCD 12. It is configured to include one or more internal or "local" power supplies (PSs) 28 (shown as 28-1 and 28-2) having respective DC outputs connected to an internal or "local" power bus 30. For example, the power supply(ies) 28 may be mounted within the NCD 12 in a quasi-permanent fashion using some form of mechanical attachment (e.g., bolting), or it may include respective "slots" at a peripheral location into which the power supply(ies) 28 can be installed in a more modular fashion, as generally known in the art. The term "local" is used herein to distinguish elements that are part of or associated with a specific NCD 12 from similar elements residing elsewhere, such as in another NCD 12. In the case of the local power bus 30 for example, it is distinguished from the power bus 20 of FIG. 2 which may be viewed as an "external" power bus. The local power bus 30 is connected to several additional components including port circuitry 32, an intermediate bus converter (IBC) 34 associated with communications operating circuitry 36, protection components (PCs) 38, and a DC-DC converter 40 associated with the port circuitry 32. The NCD 12 also includes a controller 42 and connectors 44, 46 for the mains power 16 and cables 18 respectively. In the arrangement of FIG. 4, the NCD 12 has connections to two cables 18 which are labeled with suffixes A and B respectively. This labeling is also used for the internal components of the NCD 12 associated with the respective cables 18A and 18B (e.g., protection component 38A for cable 18A, etc.).

The communications operating circuitry 36 operates in conjunction with the port circuitry 32 to provide network communications functions. For example, in the case of a network switch, the communications operating circuitry 36 includes a high-bandwidth switching fabric and connections to the port circuitry 32 that routes communications packets among the ports 14 according to any of a variety of communications protocols. The port circuitry 32 provides physical-layer and perhaps logical-layer termination of communications links connected to the ports 14, and it also exchanges communications packets with the communications operating circuitry 36 as part of the switching or other functionality provided thereby. Also, as previously mentioned, some or all of the ports 14 are powered ports that provide DC power from the local power bus 30 to powered devices that are connected at the other end of communications cables attached to the ports 14. It will be appreciated that the load for the powered ports 14 can be considerable. For example, in an NCD 12 having 48 powered ports operating according to the 802.3at standard, the overall load may be on the order of 1500 W. This requirement has several implications, including the desirability of including a "load shedding" ability to disconnect ports 14 from the local power bus 30 under certain overload or failure conditions, as described in more detail below.

The communications operating circuitry 36 receives operating power from the IBC 34, which converts the 56 V bus voltage of the local power bus 30 to a more usable lower "intermediate" voltage such as 12 V. There may be one or more additional converters within the communications operating circuitry 36 for other required operating voltages. In a similar manner, the DC-DC converter 40 generates usable operating voltage(s) for the port circuitry 32 from the local power bus 30.

The PCs 38 and connectors 46 provide connections to respective cables 18 and external power buses 20 (FIG. 1). As described in more detail below, power is shared with other NCDs 12 by providing direct, DC connections among their respective local power buses 30 and manipulating respective local power supply operating voltages to achieve a desired pattern and amount of power sharing. The PCs 38 enable current in either direction (either into or out of the NCD 12) under normal operating conditions, as well as protective isolation between the NCD 12 and the cables 18 under either transient (e.g. start-up) or failure conditions.

The controller 42 is responsible for controlling aspects of power-sharing operation as described in more detail below. The controller 42 generally has functional connections to all the other components of the NCD 12 shown in FIG. 4, as well as to other NCDs 12 via the CS bus 22 and communications bus 24 of FIG. 2. In some embodiments it may be desirable that the controller 42 be largely dedicated to power control and closely related functions, such as environmental monitoring for example. In such cases the controller 42 may be realized in the form of a so-called "system on a chip" which includes a CPU, memory (ROM and RAM), and a variety of peripheral and interface circuitry. The controller 42 may operate under higher-level control exercised by a processor within the communications operating circuitry 36 that is responsible for overall operation of the NCD 12, including its participation in a network management scheme. Such a processor typically executes a real-time operating system such as the IOS® system from Cisco Systems Inc. Details of certain connections and functions of the controller 42 are provided below.

Although FIG. 4 is primarily a functional diagram, it will be appreciated that the arrangement of components in FIG. 4 may generally represent an example physical layout as well, taking FIG. 4 as a top view. Thus FIG. 4 also includes a representation of a housing 48 in which the various components may be mounted. Physically, the PSs 28 are typically elongated, brick-shaped items, and the port circuitry 32 may be realized by a long narrow circuit board spanning the width of the NCD 12 adjacent the front panel. The communications operating circuitry 36 may be realized as a single relatively large circuit board, perhaps containing so-called "daughter" cards for memory or other components. It may be desirable in some embodiments to mount the PCs 38 and connectors 46 (indicated as protection circuitry 50) on a single circuit board. This may be in the form, for example, of a so-called "mezzanine" board which is disposed parallel to and facing a larger circuit board containing the communications operating circuitry 36 and includes suitable connectors for internal and external connections.

Figure 5:
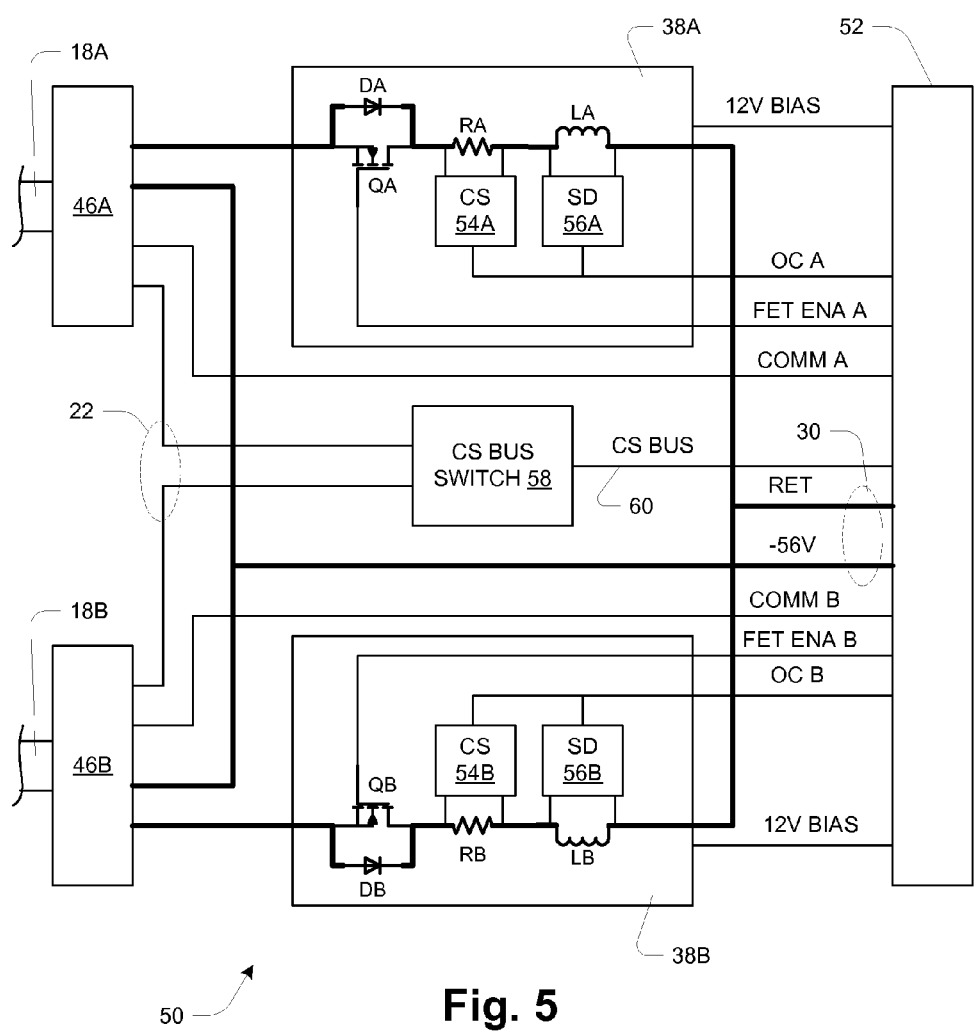
FIG. 5 is a block diagram of a protection component.

FIG. 5 illustrates the protection circuitry 50. The A and B suffixes are again used to associate components with respective cables 18A, 18B attached to an NCD 12. The protection circuitry 50 includes the connectors 46 to the cables 18, as well as an internal connector 52 for internal connections. As described above, the connector 52 may connect to a circuit board containing the communications operating circuitry 36. For each cable 18 there is a connector 46 and a PC 38. Each PC 38 includes a power FET Q in parallel with a diode D, further in series with a sense resistor R and a sense inductor L as shown. Each PC 38 also includes a current sense amplifier (CS) 54 and a short circuit detector (SD) 56. An analog switch shown as CS bus switch 58 provides selective connection of an internal CS bus 60 to A and B side CS buses 22.

The local power bus 30 is connected as shown. The "hot side" labeled −56 V is connected directly to the connectors 46. The return side labeled RET is connected to each PC 38, specifically to one end of the Q(D)-R-L series circuit in each PC 38. The other end of each of these series circuits is connected to a respective connector 46 for connection to the return wire of the power bus 20 of the respective cable 18.

The protection circuitry 50 generally operates as follows. The conduction of each FET Q is controlled by a respective FET ENA signal. The 12V BIAS is used to generate a sufficiently high "ON" gate voltage to enable the FET Q to conduct current in either direction with low ON resistance and minimal voltage drop (e.g., 0.2 volts). The diode D prevents the sourcing of current onto the external power bus 20 by this NCD 12 when the FET Q is fully off, i.e., when the NCD 12 is functionally disconnected from the respective cable 18. It is noted that full isolation of the NCD 12 assumes that the NCD 12 at the far end of the cable 18 disables a corresponding FET, as the Q-D combination can permit sinking of current by this NCD 12 if there is an external source. It will be appreciated that the FET Q has an intrinsic source-to-bulk diode called a "body diode" that will conduct current if the source-to-drain voltage of the transistor Q becomes sufficiently high. Such conduction of a body diode is preferably avoided, because it can damage the transistor Q. Thus the diode D is preferably a Schottky or similar diode with a sufficiently low ON voltage to prevent the body diode of the transistor Q from conducting.

The resistor R is a low-value resistor used to sense current by developing a corresponding sense voltage, as generally known in the art. This voltage is sensed by the CS circuit 54 which generates an output current signal OC routed to the internal connector 52. In an analogous fashion, the inductor L is a low-value inductor used to develop a corresponding voltage when there is a sudden change in output current (high dI/dt), and this voltage is used by SD circuit 56 to contribute to the value of the OC signal routed to the connector 52.

The CS bus switch 58 selectively connects the CS bus 60 to and from the CS buses 22 (FIG. 2) of the cables 18A, 18B.

In operation, an NCD 12 can become functionally connected to each cable 18 in a "hot" (i.e., powered on) condition. This creates the possibility of undesirable transients on the cables 18 and/or local power bus 30. To avoid or minimize such transients, it is preferable that the FETs QA, QB be turned on or off slowly during any controlled connecting/disconnecting of an NCD 12 from a cable 18. This can be accomplished by appropriate operation of the controller 42 driving the respective FET ENA signal.

Figure 6:
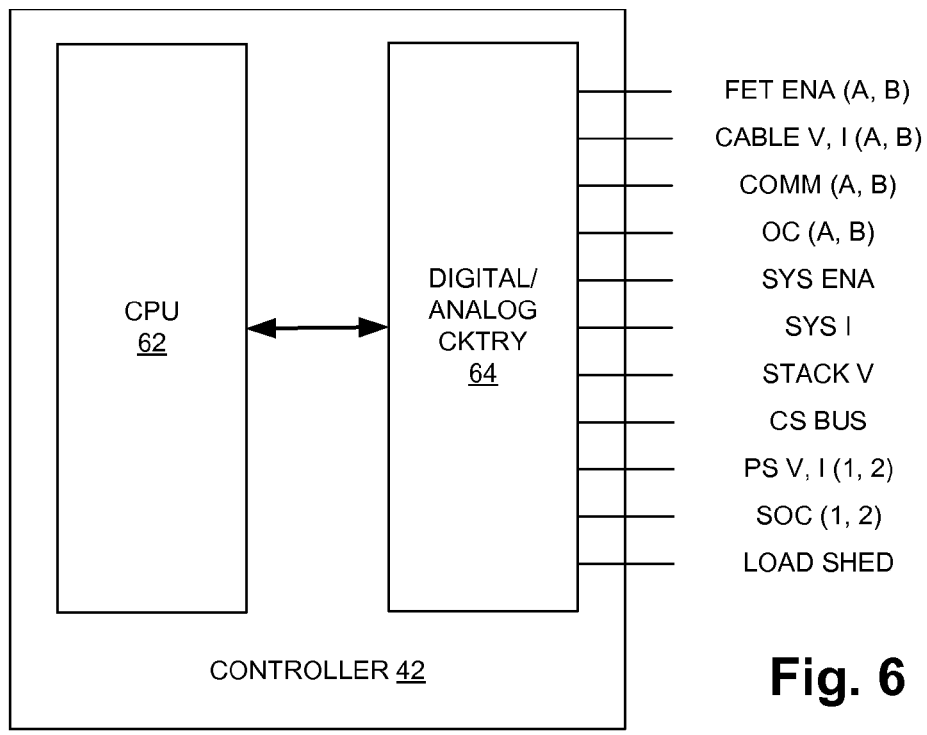
FIG. 6 is a block diagram of a controller showing external connections.

FIG. 6 shows certain details of the controller 42 according to one embodiment. A controller-style CPU 62 (i.e., having internal RAM and program ROM) interfaces to digital/analog circuitry 64 which receives input signals and generates output control signals to other power-related components of the NCD 12 such as illustrated in FIG. 4. Several signals are duplicated for each cable 18A, 18B, these being indicated by the parenthetical (A, B). Signals duplicated for the power supplies 28 are indicated by (1, 2). Table 1 below describes the signals shown in FIG. 6.

TABLE 1

Control Signals

| Signal (direction) | Description |
|---|---|
| FET ENA (output) | Enables FET Q in protection circuitry 38 |
| CABLE V (input) | Indicates voltage of respective cable |
| COMM (bidirectional) | Communications bus to other NCDs |
| OC (input) | Current on respective cable |
| SYS ENA (output) | Enables operation of IBC 34 to provide power to comm. op. circuitry 36 |
| SYS I (input) | Indicates current drawn by NCD 12 |
| STACK V | Voltage on internal power bus 30 |
| CS BUS (bidirectional) | Inter-NCD communication of relative current/load sharing |
| PS V, I (input) | Voltage and current provided by local power supply |
| SOC (input) | "Sustained overload condition" indication from power supply |
| LOAD SHED | Set of control signals used to force ports 14 to shed their load and/or the IBC 34 to be disabled (thus shedding the comm.. op. circuitry 36) |

While the above description presents the controller 42 in the form of a so-called "system-on-a-chip", in alternative embodiments it may be implemented in a field-programmable gate array (FPGA) for processing and other digital logic along with external analog and mixed-signal components (e.g., A-D converters, comparators).

Figure 7:
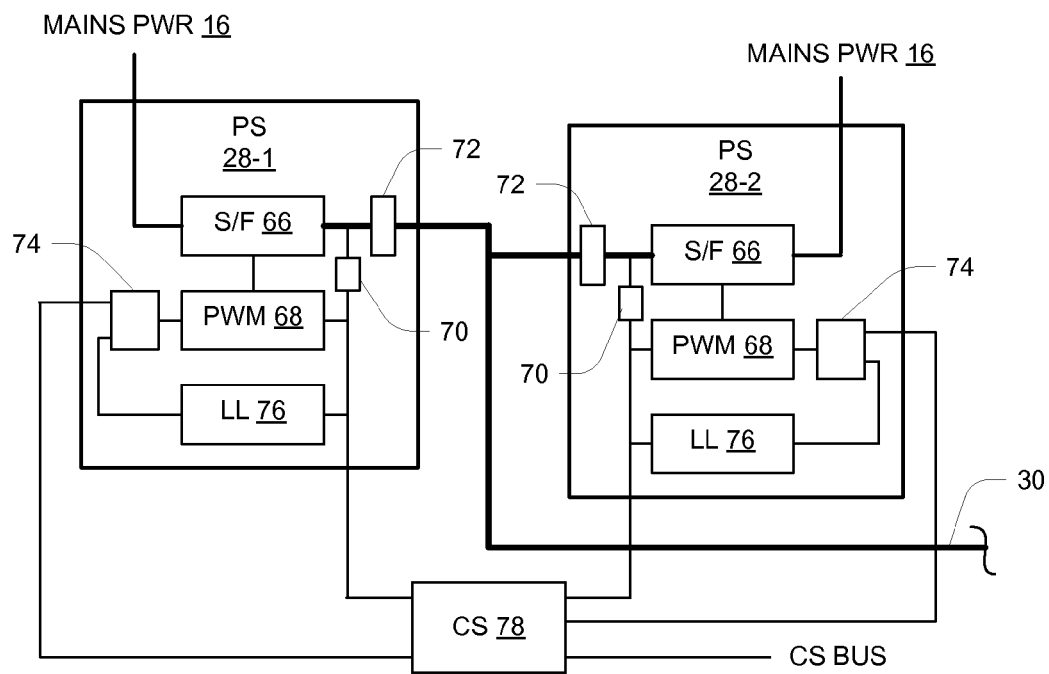
FIG. 7 is a block diagram showing control elements in and between power supplies of power-sharing network communications devices.

FIG. 7 illustrates certain details of each power supply 28 and related control circuitry. To minimize crowding in the figures, the suffixes 1, 2 are generally omitted except in the reference numbers for the power supplies 28 themselves. It will be appreciated that each power supply 28 includes separate instances of various components which are repeated in the figure.

The core power supply functionality is realized by power switching and filtering circuitry (S/F) 66 along with pulse-width modulation circuitry (PWM) 68 which generates high-rate switching control signals having their pulse widths modulated so as to regulate the output of the power supply 28, as generally known in the art. The PWM circuitry 68 operates in response to values of output voltage and current sensed by sensing circuitry 70. Each power supply 28 generally also includes output protection circuitry 72 on the connection to the local power bus 30.

The PWM circuitry 68 also operates in response to a reference signal from reference circuitry 74. The reference signal establishes a target operating voltage, which the PWM circuitry 68 achieves by its operation. Thus the reference signal can be viewed as a voltage control signal. The value of the reference signal is influenced by two distinct control loops. At the level of each power supply 28, load line (LL) control circuitry 76 imposes certain bounds of operation of the power supply 28, as described below. The other input to the reference circuitry 74 of each power supply 28 is from current sharing (CS) control circuitry 78. This circuit imposes control to achieve a desired sharing of total system load current by the power supplies 28, as also described below. In the illustrated embodiment, the CS control circuitry 78 is realized as part of the controller 42 of FIGS. 4 and 6. It may be preferable for the LL control circuitry 76 to be included within each power supply 28, as it preferably operates at a rate equal or similar to the switching frequency of the PWM circuitry 68.

Two examples are now provided to illustrate load sharing functionality which is realized in part by operation of the CS control circuitry 78 of each NCD 12.

The first example is reflected in Table 2 below, which is explained as follows. There are three NCDs 12, each having a power supply capacity of 20 A of output current at a system operating voltage (nominally 56 V). Note that this capacity may be provided by one or multiple PSs 28 at a given NCD 12—the singular "power supply" is used for convenience in these examples without loss of generality. Each NCD 12 also has a local load (Load) measured in amperes, and its power supply provides a supply current (Supp) which is a percentage (%) of its rated maximum output current. There are three sets of values, an Initial set at some initial time, an Intermediate set occurring immediately in response to a change in the load, and a Final set obtained as the system automatically adjusts to the new load over a response time of the current-sharing control loop circuitry.

TABLE 2

Load Sharing Example 1

| | Initial | | | Intermediate | | | Final | | |
|---|---|---|---|---|---|---|---|---|---|
| NCD | Load | Supp | % | Load | Supp | % | Load | Supp | % |
| 1 | 10 | 10 | 50 | 4 | 4 | 20 | 4 | 8 | 40 |
| 2 | 10 | 10 | 50 | 10 | 10 | 50 | 10 | 8 | 40 |
| 3 | 10 | 10 | 50 | 10 | 10 | 50 | 10 | 8 | 40 |
| System | 30 | 30 | 50 | 24 | 24 | 20 | 24 | 24 | 40 |

Initially, each NCD has 10 A of load and each local power supply provides 10 A of current. The total system load is 30 A which is 50% of system supply capacity. Because the power supplies are all identical and operating at 50% of their respective capacities, there is no current sharing among the NCDs 12. This will be reflected in their respective local supply voltages, which are all substantially equal so that no current is conducted in either direction through the protection circuitry 38 and cables 18.

The Intermediate state begins with a drop in the load at NCD #1 from 10 A to 4 A. This reduction is initially absorbed by the local power supply for NCD #1, so that its local % falls to 20%. The other NCDs 12 initially remain at the 50% values. The % value of NCD #1 is now the lowest % value in the system, and therefore its value is broadcast to the other NCDs 12 via the CS bus 22. Now the system enters a period of adjustment which eventually leads to the Final operating condition, in which the % of each NCD 12 stabilizes at a new value of 40%, corresponding to the new system load of 24 A.

The adjustment occurs as follows. The CS control circuitry 78 in each NCD 12 compares its own % to the system % as reflected on the CS bus 22 (for example, by subtracting one from the other and comparing the result with zero). If the local % is higher than the system %, then the CS control circuitry 78 adjusts the voltage of its local power supply 28 downwardly (via the local reference circuitry 74), and if the % is equal to or lower than the system %, then the CS control circuitry 78 adjusts the local power supply voltage upwardly. This operation has a primary effect of creating or modifying the amount(s) of voltage drop(s) across one or more of the protection circuits 38 of the NCDs 12, which in turn creates or modifies the magnitude and direction of a current flowing through the corresponding cable 18 from one NCD 12 to another. As the currents on the cables 18 changes, so does the loading of corresponding power supplies, which leads to a change in the relationships of the local % values to the system % value on the CS bus 22, leading to further voltage adjustments etc. all with the aim of equalizing the relative sharing of the load across the power supplies of all NCDs 12.

Under normal circumstances the adjustment leads to a new stable operating condition indicated as Final in Table 2, in which it can be seen that each power supply is now loaded at 40%. It will be appreciated that in this operating condition, the power supply of NCD #1 provides 4 A of current to its local load and 2 A apiece to the NCDs #2 and #3 via respective cables 18, for a total of 8 A. Thus the operating voltages at NCDs #2 and #3 will have been adjusted downward to be less than the voltage at NCD #1 so as to draw this amount of current from it. The precise values of these voltages will depend on a variety of factors, including the number of "hops" or intermediate NCDs 12 through which current travels to another NCD 12. In this simplified example having only three NCDs, each NCD may be connected directly to each other one through a respective cable 18 (i.e., a ring configuration as in FIG. 1). But in systems having more NCDs 12 coupled together in a ring or chain configuration, there may be one or more hops from one NCD 12 sourcing current to another NCD 12 which sinks the current, and in such a case the pattern of voltages necessary to draw the required current will be different from those in the simplified Example 1.

Table 3 below presents a second simple example illustrating another aspect of operation. In this case, the power supplies of the NCDs 12 are of unequal capacities. Specifically, it is assumed that the power supply of NCD #1 has a capacity of 10 A, NCD #2 20 A, and NCD #3 30 A. In this case, different absolute values of current correspond to the same relative sharing of the load. In the Initial state, the power supplies are loaded at 5, 10 and 15 A respectively, but each of these represents the same 50% loading of the respective supply. Thus in the Initial state NCD #3 provides 5 A of current to NCD #1 to meet its load.

In this example the load step occurs at NCD #2 at the beginning of the Intermediate state. The adjustment leads to a Final state in which each supply is again operating at 40%, but now with different absolute currents due to their respective capacities. NCD #1 obtains 4 A from NCD #2 and 2 A from NCD #3.

TABLE 3

Load Sharing Example 2

| NCD | Initial | | | Intermediate | | | Final | | |
| --- | --- | --- | --- | --- | --- | --- | --- | --- | --- |
| | Load | Supp | % | Load | Supp | % | Load | Supp | % |
| 1 | 10 | 5 | 50 | 10 | 5 | 50 | 10 | 4 | 40 |
| 2 | 10 | 10 | 50 | 4 | 4 | 20 | 4 | 8 | 40 |
| 3 | 10 | 15 | 50 | 10 | 15 | 50 | 10 | 12 | 40 |
| System | 30 | 30 | 50 | 24 | 24 | 20 | 24 | 24 | 40 |

As previously mentioned, the exact pattern of voltages at the NCDs 12 to accomplish a desired load sharing depends on a variety of factors, including for example the number and arrangement of NCDs 12 and the voltage drops occurring across each cable 18 and protection circuit 38 (which may be functions of the level of current through these elements). Generally there will also be absolute limits placed on the operating voltages by system specifications. For example, the 802.3at standard specifies a voltage in the range of 50-57 V at the output of a port 14. Thus the voltages at the internal power buses 30 should not go outside this range. These limits can be enforced by logic/circuitry in the controller 42. When the system is making an adjustment and one or more NCDs 12 hits either an upper or lower voltage limit, the other NCDs will automatically respond accordingly if they have not hit limits. In normal operation, a condition should not occur in which one NCD 12 is at an upper limit and another is at a lower limit, as this would indicate that the adjustment capacity has been completely used and no further adjustment is possible for some incremental additional change in the loading. This would be either an erroneous operating condition (e.g., overload) or a flaw in the design or configuration of the system. It should also be noted that it may be desirable to bias the adjustment algorithm employed by the CS control circuitry 78 to promote operation in a particular sub-range of the overall operating voltage range. For example, if the algorithm is biased to make upward adjustments more rapidly than downward ones, it may promote operation at the higher end of the overall range.

The above discussion illustrates load/current sharing operation in systems of power-sharing NCDs 12, with a particular example goal of equalized relative loading. There are possible modifications and variations on the steady-state behavior (e.g., the degree and distribution of load sharing) as well as aspects of dynamic behavior that are now described.

Briefly with respect to steady-state behavior, the above examples assume a goal of equalized load sharing as a percentage of capacity, and it is anticipated that this will be a typical embodiment. Nonetheless, there may be alternative embodiments using goals or operating targets. For example, for some power supplies 28 it may be preferable to bias operation in one direction or another, either for greater efficiency or some other reason. In this case, the CS control circuitry 78 at one or more NCDs 12 may apply some factor to the sharing % so that a desired unequal sharing occurs. For example, perhaps it is preferred that larger power supplies 12 operate at higher relative loading. In this case the CS control circuitry 78 at an NCD 12 with such a large power supply 12 may effect voltage adjustment so that the local power supply 12 operates at some desired fraction higher than the system %, e.g., at 1.1 or 1.2 times the system %. Other patterns of unequal or prioritized sharing could of course be used. Additionally, the parameters specifying the sharing scheme could be fixed or programmable for flexibility in system configuration.

Figure 8:
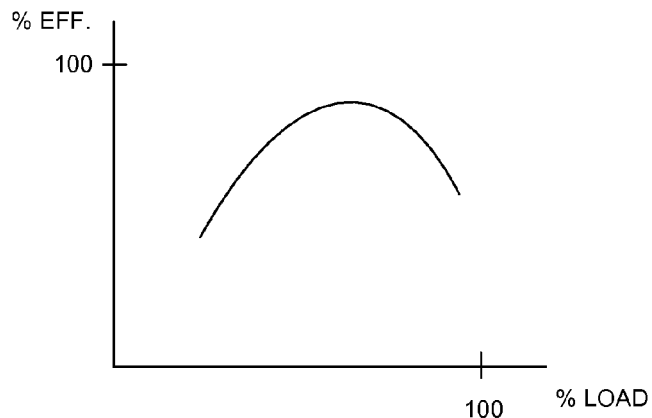
FIG. 8 is a graph of load-dependent efficiency of a power supply.

One specific case of prioritized current sharing may be based on achieving high efficiency operation. It is known that switching power supplies exhibit load-dependent efficiency (ratio of output power to input power). A generalized plot of efficiency versus load is shown in FIG. 8. The load sharing may be arranged to maximize the efficiency of one or more power supplies 28 if possible. This kind of sharing may be quite different from the equal sharing described above. In a system such as that of Example 1 above, imagine that each power supply has peak efficiency at 75% loading and considerably lower efficiency at much lower loading. In that case, it may be preferable from an efficiency perspective to operate two power supplies (assumed to be in different NCDs 12) at 75% and the third power supply (in a third NCD 12) at whatever lower percentage is needed to supply the rest of the required operating current. Alternatively, one of the power supplies 12 could be disabled entirely so that the remaining two power supplies 12 automatically share the load at more efficient higher operating points. Other control regimes are of course possible.

While the above description focuses on load sharing among NCDs 12 all having functioning power supplies, it is to be understood that load sharing may also occur when one or more NCDs 12 either lacks a power supply (by design or configuration) or has a non-functioning power supply (e.g., due to failure during operation). An NCD 12 having no functioning local power supply does not participate in the current sharing controlled by the CS bus 22. Rather, load sharing occurs by action of a higher-level control mechanism of the controller 42 of each NCD 12, which includes signaling the absence or loss of function of a local power supply 28 and a response of re-allocating the overall system load (including the load at the NCD 12 having the absent/failed supply 12) among the other NCDs 12 having functional supplies 12. This re-allocation may be realized in part using "power budgeting" as described below.

The presently disclosed power-sharing technique can also be used to provide redundancy in a system to enhance availability. It can be appreciated that a set of power-sharing NCDs 12 operate to adjust to changes in the relationship between supply capacity and loading, both within an individual NCD 12 and system-wide. A system can be configured with spare capacity to be used only in the event of a failure of a power supply 12, for example. The spare capacity is included within the current-sharing control domain so that it is available to participate in load sharing as described herein. This form of redundancy is generally referred to as "N+1" or "active-active" redundancy, meaning that all hardware resources (e.g., power supplies 12) are used in normal operations as well as after a failure, but during normal operation spare capacity is reserved to meet the system load in the event of the failure (e.g., failure of one power supply 12). This capability is provided in part by system configuration (providing sufficient overall power supply capacity) and a mechanism for limiting normal-use power consumption in a way that sufficient spare capacity is always available to take up the capacity lost when the specified failure occurs.

One mechanism for reserving spare capacity may be referred to as "power budgeting". A power budget is a figure representing an amount of power capacity still available for use, and can be calculated as:

$$P_{budget} = P_{sys} - P_{used} - P_{avail}$$

where $P_{sys}$ represents total supply capacity, $P_{used}$ represents an amount of power already allocated for use (whether actually currently used or not), and $P_{avail}$ represents power reserved to meet availability requirements. At any given time, a new load can be added to a system as long as is does not exceed $P_{budget}$. In systems not requiring N+1 redundancy, $P_{avail}$ is 0. This can be seen as a straight "load sharing" mode of operation. The use of a non-zero $P_{avail}$ represents operation in a "redundant" mode.

The above description of power budgeting can be taken as a system-level description, factoring in the loading and supply capacity across all NCDs 12 participating in a power-sharing set. It will be appreciated that there is also a view of power budgeting at the level of an individual NCD 12. From this perspective, the above calculation of $P_{budget}$ also includes $P_{cable}$, the amount of power provided to other NCDs 12 via the power-sharing cables 18 attached to the NCD 12. While theoretically an entire set of NCDs 12 could be powered by one large power supply 28 in one NCD 12, there are numerous practical limitations on the amount of external power that can be sourced or sunk by an NCD 12. One is the current capacity of the CS bus 22. Note in this respect that current for multiple sinking NCDs 12 may flow through one CS bus 22 attached to a sourcing NCD 12. Another limitation is the lowest operating voltage that can be tolerated (such as discussed above), which sets a bound on the overall voltage drop from a sourcing NCD 12 to a sinking NCD 12. This bound on voltage corresponds to a bound on current (IR drop across cables and other components) and power that can be transferred. These limitations must generally be considered both in overall system planning and configuration as well as during operation to avoid exceeding node-specific power budgets at the NCDs 12.

Examples 1 and 2 above also illustrate a dynamic aspect of operation. Upon the occurrence of a load step (abrupt change in load current) at an NCD 12, the first response is by the local power supplies 28. Initially the local power supplies adjust their operation (by operation of the PWM circuits 68) to try to meet the new load conditions. If the load step is sufficiently small, then the local supplies 28 will be able to adjust quickly (i.e., on the order of 1 ms) to the new load conditions, and then the CS control circuitry 78 operates over a longer period (tens of ms) to adjust the operating voltages at all NCDs 12 to effect a re-distribution of the total system load. However, it is possible that the load step may be an increase to a new load value that the local power supply 28 cannot sustainably handle. For example, the local power supply 28 may be rated to provide 10 A maximum sustained current. If the local load increases beyond 10 A (e.g., to 12 or 15 A) while the overall system loading stays within expected bounds, then in time the current-sharing operation will re-distribute the load among the power supplies 28 of all NCDs 12 so that no power supply 28 is overloaded, including the 10-A local power supply 28. But until that re-distribution occurs, the local power supply 28 may be temporarily overloaded. In general, it will be desirable that the power supplies 28 be able to handle temporary overloads of some specified duration to allow time for the current-sharing mechanism to partly or wholly re-distribute the load to a sustainable pattern (and/or for load shedding to occur, as described below). The capacity for temporary overloading will generally depend on a number of things, such as the response time of the current-sharing mechanism, the size of expected load steps, and the design of the power supplies 28.

Figure 9A:
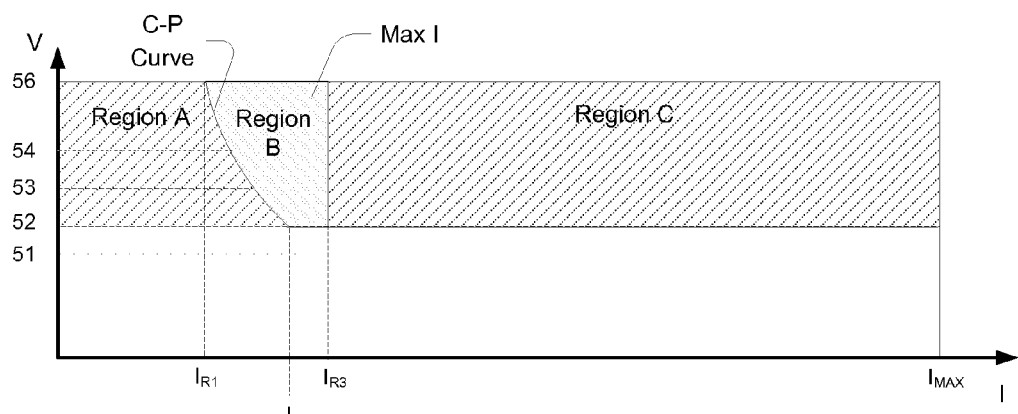
FIGS. 9A and 9B depict operating regions and the use of load lines in a power supply.

FIG. 9A is a graph showing ranges of operation of output voltage V and output current I for a power supply 28. Region A is referred to as the Safe Continuous Operating area, i.e., a region of operation that the power supply 28 can sustain indefinitely. Region A is separated from a higher-power Region B by a constant-power (C-P) curve. In a typical power supply, overcurrent protection circuitry may only permit operation in Region B for very brief periods as may be desired to absorb transients. Region C is defined by a hard maximum current limit, shown as 19.5 A in FIG. 9A. Operation in Region C will normally not occur, as current-limiting circuitry operates quickly to prevent very high overload current from causing damage.

One technique that may be used is to manage the transitions between operating regions in a way that distinguishes between normal temporary load steps (which will be absorbed by the current sharing mechanism) and true overload conditions which require prompt action to avoid damage. It may be permissible for a power supply 28 to operate in Region B or even Region C for some very brief period of time. However, one problem is the need for a circuit to continuously perform a power calculation based on the operating voltage and current to determine whether a power supply 28 has entered region B. This calculation will generally be relatively slow if performed by a processor such as controller 42 for example. Something faster may be needed to effect a fast temporary reaction to load steps while the current-sharing mechanism provides a longer-term response.

Figure 9B:
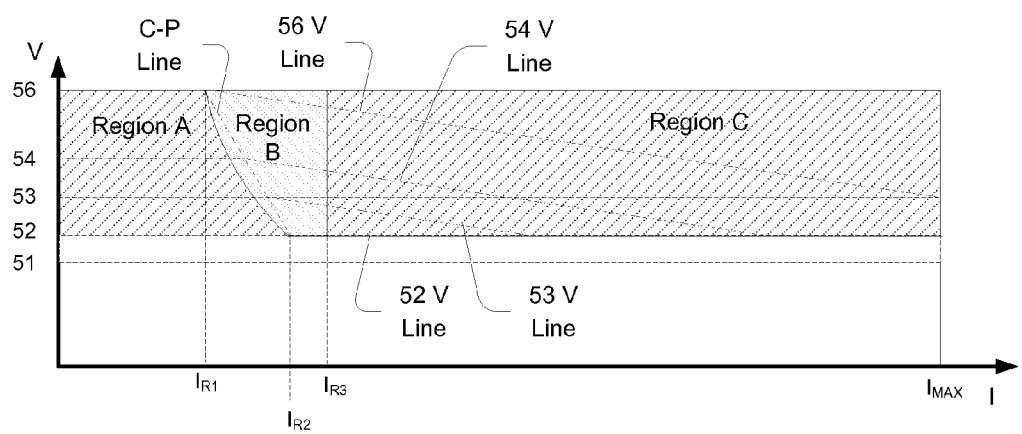

FIG. 9B illustrates a technique that can be used for such a purpose. Two or more "load lines" can be employed to detect and control overload operation. Because the load lines are defined simply by their endpoints, a small amount of dedicated hardware (i.e., LL control circuitry 76) can be used to continuously monitor operation with a very fast response time on the order of the operating period of the PWM circuitry 68 (e.g., tens of microseconds). In the illustrated example, a first load line is referred to as a constant-power (CP) line which approximates the C-P curve separating Regions A and B. Additional load lines are shown which maintain corresponding output voltages (54 V, 53 V etc. as shown) while limiting operation in Region C. The size and duration of operation in the area below each load line in Region C can be specified for a power supply 28 to achieve a desired balance between safe operation and sufficient continued operation to enable the current-sharing mechanism to operate.

Briefly, operation with the load lines involves (1) reducing output voltage with increasing current according to the relatively steep constant-power (C-P) load line, and (2) to further reduce output voltage with further increasing current according to the relatively shallow constant-voltage load line. This operation manages the temporary overload to strike a desired balance between protection and providing adequate time for a current-sharing adjustment to be made.

While the above description is cast in terms of a "load step" which might imply an increase in overall load current, it will be appreciated that the description is equally applicable to an abrupt loss of supply capacity, such as when a power supply 28 fails. Thus, it is to be understood that a "load step" as used herein generally refers to any event which so affects the relationship between the load current and supply capacity as to require a response beyond the normal regulation function provided within each power supply 28. These responses include current sharing and load-line limiting as described above, as well as load shedding described below.

Load shedding is another mechanism that may be employed to handle overload conditions. Load shedding generally refers to the purposeful disconnection of loads from the power distribution network to avoid a sustained system-wide overload condition. Note that such an overload can arise both from a sudden increase in load beyond current capacity and from sudden loss of some amount of capacity (e.g., a power supply 28). Thus load shedding can be viewed as an alternative or supplement to redundancy mechanisms. Under normal conditions it would be expected that no load shedding would occur and that the NCDs 12 provide high-availability network communications operation. But in the event of relatively rare operating conditions, loads may be selectively shed to try to maintain a level of safe operation until the condition is corrected.

Any load shedding scheme assumes the existence of a mechanism that can selectively disconnect loads, such as mechanical or electronic switches (e.g., FETs) placed at strategic points and having switch control inputs that can be exercised by load-shedding control circuitry. Load shedding may be done locally, system-wide, or both. In an embodiment such as described herein, the control functionality may be realized by appropriate software executing in the controllers 42 and in the processor of the communications operating circuitry 36 of each NCD 12. It is noted that the power circuitry of the ports 14 typically already includes a protection power switch (FET) which can also be used to effect shedding of POE load current. It may also be desirable to enable shedding of the entire communications operating circuitry 36, although this may have limited effectiveness due to the relatively low load and also assumes no involvement of the processor therein for at least this aspect of load-shedding operation.

It may also be desirable to use a priority scheme for load shedding to control the nature of the disruption to system operation. As an example, within a given NCD 12 the POE ports 14 may be classified as either High priority or Low priority based on the device or customer to which they are attached. For example, ports for desktop IP telephones may be classified as Low priority (and be shed first) while ports for security cameras or similar equipment may be classified as High priority (and be shed later). Priorities may also be applied at the level of the NCDs 12 as well, so that one entire Low priority NCD 12 may be disconnected as part of load shedding for example (accomplished through use of the protection component 38 to isolate the NCD from the remaining NCDs 12). Whatever scheme is used, loads are preferably shed in order from lowest priority to highest priority as necessary to address the overload condition. It should be emphasized that load shedding is preferably based on actual loads rather than budgeted loads as discussed above. If a power budget within an NCD 12 is exceeded, for example due to failure of a power supply 28, it will cause corrective action to be taken but in the meantime the system will operate to meet the load if possible (albeit with reduced tolerance for additional failures). Load shedding begins when the actual load exceeds available supply capacity.

While various embodiments of the invention have been particularly shown and described, it will be understood by those skilled in the art that various changes in form and details may be made therein without departing from the spirit and scope of the invention as defined by the appended claims.

What is claimed is:

1. A network communications device for use as one of a set of power-sharing network communications devices, comprising:
   a local power bus;
   network communications operating circuitry constituting a local load connected to the local power bus to draw operating power therefrom;
   a local power supply having a power output connected to the local power bus to deliver power thereto at a local supply voltage, the local power supply being operative to vary the local supply voltage over a predetermined range in response to a voltage control signal supplied thereto;
   a protection component connected between the local power bus and an external power cable used in operation to connect the network communications device to another of the power-sharing network communications devices, the protection component providing an interruptible low-impedance direct current path for carrying current between the local power bus and the external power cable based on direction and magnitude of a voltage difference therebetween; and
   control circuitry operative to (a) drive an external current-sharing bus connected among the power-sharing network communications devices to influence a value of a system current-sharing signal carried by the current-sharing bus, the system current-sharing signal indicating a level of system power loading of a set of power supplies distributed among the power-sharing network communications devices, (b) generate a difference signal indicating a difference between a local power loading of the local power supply and the level of system power loading as reflected by the system current-sharing signal, and (c) generate the voltage control signal based on the difference signal to achieve a predetermined sharing of the system power loading by the local power supply.

2. A network communications device according to claim 1, wherein the protection component comprises a power field-effect transistor, a current-sensing resistor, and a short-detecting inductor arranged in series between the local power bus and the external power cable.

3. A network communications device according to claim 2, wherein the protection component further includes a power Schottky diode connected in parallel with the power field-effect transistor, the Schottky diode being oriented in like manner to orientation of a body diode of the field effect transistor and having a lower ON voltage than the body diode to prevent conduction of the body diode during normal operation.

4. A network communications device according to claim 1, further including power-over-Ethernet circuitry including a plurality of powered Ethernet ports operative to supply power from the local power bus to remote powered devices attached by cable to the powered Ethernet ports, and wherein the control circuitry is further operative to impose limits on the voltage control signal so as to maintain the local supply voltage within in a predetermined voltage range corresponding to a voltage range for the DC power expected by the remote powered devices.

5. A network communications device according to claim 4, wherein the predetermined voltage range is 50 to 57 volts DC, and wherein the network communications device is to be used in a ring configuration with the set of power-sharing network communications devices causing multiple accumulated voltage drops between power-sharing network communications devices separated by one or more intervening power-sharing network communications devices in the ring configuration.

6. A network communications device according to claim 4, wherein the network communications operating circuitry requires one or more relatively low operating supply voltages and includes respective DC-DC converters operative to generate the operating supply voltages from an intermediate bus voltage having a value lower than the local supply voltage, and further including an intermediate bus converter connected to the local power bus and operative to generate the intermediate bus voltage from the local supply voltage.

7. A network communications device according to claim 1, wherein the protection component is a first protection component and the external power cable is a first external power cable connecting the network communications device to a first one of the set of network communications devices, and further including a second protection component connected between the local power bus and a second external power cable used in operation to connect the network communications device to second one of the set of power-sharing network communications devices, the second protection component providing an interruptible low-impedance direct current path for carrying current between the local power bus and the second external power cable based on direction and magnitude of a voltage difference therebetween.

8. A network communications device according to claim 1, wherein the local power supply includes overload control circuitry implementing two or more load lines corresponding to limits on output voltage and output current, the overload control circuitry being operative in a response time substantially less than a time required to achieve the predetermined sharing of the system power loading to (1) to reduce output voltage with increasing current according to a relatively steep constant-power load line, and (2) to further reduce output voltage with further increasing current according to a relatively shallow constant-voltage load line.

9. A network communications device according to claim 1, wherein the network communications device is co-operative with the set of power-sharing network communications devices to implement redundancy in an N+1 fashion reserving spare power supply capacity which is available to meet the system power loading by normal current-sharing operation in the event of failure of a power supply at any of the power-sharing network communications devices.

10. A network communications device according to claim 1, further including power-over-Ethernet circuitry including a plurality of powered Ethernet ports operative to supply power from the local power bus to remote powered devices attached by cable to the powered Ethernet ports, and wherein the control circuitry is further operative in response to an overload condition to perform one or more of (a) selectively disconnecting the powered Ethernet ports from the local power bus, (b) disconnecting the communications operating circuitry from the local power bus, and (c) disconnecting the local power bus of the network communications device from the external power cable to reduce the system power loading, such disconnecting being according to a predetermined priority-based ordering of loads to be shed.

11. A network communications device according to claim 1, wherein the predetermined sharing of the system power loading is based at least in part on a goal of operating one or more power supplies of the set of network communications devices at a point of highest efficiency notwithstanding a resulting unequal sharing of the system power loading among the network communications devices.

12. A network communications device according to claim 1, wherein the control circuitry is operative in the event of failure of the local power supply to refrain from driving the external current-sharing bus so as to not influence the value of the system current-sharing signal.

13. A method of operating a network communications device used as one of a set of power-sharing network communications devices, the network communications device including a local power bus, network communications operating circuitry constituting a local load connected to the local power bus to draw operating power therefrom, and a local power supply having a power output connected to the local power bus to deliver power thereto at a local supply voltage, the method comprising:

permitting current flow between the local power bus and an external power cable based on direction and magnitude of a voltage difference therebetween, the external power cable used to connect the network communications device to another of the set of network communications devices for power-sharing purposes;

driving an external current-sharing bus connected among the power-sharing network communications devices to influence a value of a system current-sharing signal carried by the current-sharing bus, the system current-sharing signal indicating a level of system power loading of a set of power supplies distributed among the power-sharing network communications devices;

generating a difference signal indicating a difference between a local power loading of the local power supply and the level of system power loading as reflected by the system current-sharing signal; and generating a voltage control signal used by the local power supply to vary the local supply voltage over a predetermined range, the voltage control signal being generated based on the difference signal to achieve a predetermined sharing of the system power loading by the local power supply.

14. A method according to claim 13, wherein the local power supply includes overload detection circuitry and internal protection circuitry, the overload detection circuitry being operative to detect an overload condition and assert an overload signal, and further including responding to the overload signal by taking action to remove the overload condition before the internal protection circuitry operates to disable the providing of output power from the local power supply.

15. A method according to claim 13, further including cooperating with the set of power-sharing network communications devices to implement redundancy in an N+1 fashion reserving spare power supply capacity which is available to meet the system power loading by normal current-sharing operation in the event of failure of a power supply at any of the power-sharing network communications devices.

16. A method according to claim 13, wherein the network communications device further includes power-over-Ethernet circuitry including a plurality of powered Ethernet ports operative to supply power from the local power bus to remote powered devices attached by cable to the powered Ethernet ports, and further including responding to an overload condition to disconnect the powered Ethernet ports from the local power bus.

17. A method according to claim 13, further including, in the event of failure of the local power supply, refraining from driving the external current-sharing bus so as to not influence the value of the system current-sharing signal.

18. A network communications system, comprising:
a set of power-sharing network communications devices each including network communications operating circuitry for performing a communications function in the network communication system, the network communications operating circuitry connected to a local power bus to draw operating power therefrom and constituting a local load of the respective network communications device, each network communications device being configured to have a local power supply installed therein having a power output to be connected to the local power bus to deliver power thereto at a local supply voltage, the local power supply being operative to vary the local supply voltage over a predetermined range in response to a voltage control signal supplied thereto;
a set of power cables interconnecting the power-sharing network communications devices together to enable power sharing therebetween; and
a current-sharing bus connected among the power-sharing network communications devices and operative to carry a system current-sharing signal indicating a level of system power loading of a set of the power supplies distributed among the power-sharing network communications devices;
wherein each network communications device further includes:
a protection component connected between the local power bus and a respective one of the power cables to which the network communications device is connected, the protection component providing an interruptible low-impedance direct current path for carrying current between the local power bus and the respective power cable based on direction and magnitude of a voltage difference therebetween; and
control circuitry operative, when the respective local power supply is installed and operating there, to (a) drive the current-sharing bus to influence a value of the system current-sharing signal based on loading of the local power supply, (b) generate a difference signal indicating a difference between a local power loading of the local power supply and the level of system power loading as reflected by the system current-sharing signal, and (c) generate the voltage control signal to control the locally supply voltage from the local power supply based on the difference signal to achieve a predetermined sharing of the system power loading by the local power supply.

19. A network communications system according to claim 18, wherein each of the power-sharing network communications devices includes two of the protection components, each connected between the local power bus and a respective one of the power cables, and wherein the power-sharing network communications devices are three or more in number and interconnected by the power cables in a ring fashion.

20. A network communications system according to claim 18, wherein each of the power-sharing network communications devices includes two of the protection components, each connected between the local power bus and a respective one of the power cables, and wherein the power-sharing network communications devices are three or more in number and interconnected by the power cables in a star fashion.

* * * * *